United States Patent Office 3,501,690
Patented Mar. 17, 1970

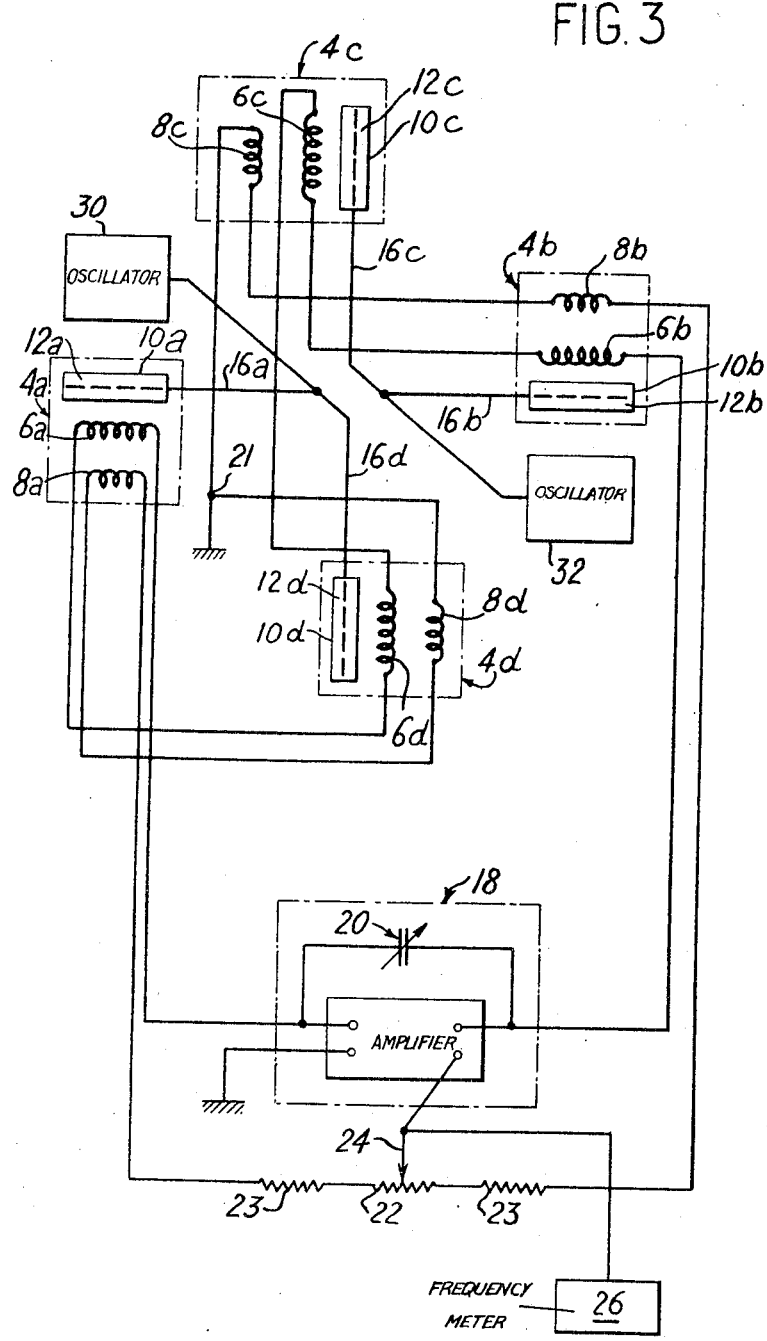

3,501,690
NUCLEAR MAGNETIC RESONANCE MAGNETOM-ETER OF THE SPIN COUPLING TYPE
Antoine Salvi, Fontaine, and Henri Glenat, Grenoble, France, assignors to Commissariat a l'Energie Atomique, Paris, France
Filed Aug. 9, 1967, Ser. No. 659,451
Claims priority, application France, Aug. 23, 1966, 73,924
Int. Cl. G01n 27/00
U.S. Cl. 324—.5     5 Claims

ABSTRACT OF THE DISCLOSURE

The magnetometer comprises a measurement head, an amplifier, an oscillator for exciting electronic resonance lines of samples of the measurement head, said head including four similar units forming two couples disposed at 90° to each other, each couple consisting of two units in line with each other, every unit comprising two coils coaxial with each other and wound about a vessel containing a sample.

---

The present invention relates to improvements in magnetometers having both a nuclear and an electronic resonance of the "spin coupling oscillator" type, that is to say including Block coils (surrounding a vessel containing a sample of a material having gyromagnetic properties) connected to the input and the output of a linear amplifier to form a loop, wherein is measured the frequency of oscillation at the nuclear resonance frequency, which is proportional to the intensity of the magnetic field in which the magnetometer is located.

This invention relates to the prior U.S. patent application Ser. No. 543,113 filed Apr. 18, 1966 by Antoine Salvi for "Nuclear Magnetic Resonance Magnetometers of the Spin Coupling Oscillator Type," now U.S. Patent No. 3,441,838, issued Apr. 29, 1969.

In this prior patent application was disclosed a magnetometer comprising, in combination:

A pair of vessels each containing a sample of a material having gyromagnetic properties;

A substantially linear amplifier;

Two pairs of coils, one pair being connected to the input and the second to the output of said amplifier, the two coils of each pair being substantially identical to each other and wound, about respective parallel axes, but in opposed directions, about a vessel different for each of them, whereby, at the input of said amplifier, the electromotive forces induced in the two coils connected with this input by the nuclear magnetic resonance are added to each other, whereas the electromotive forces that may be induced in these two coils both by the external electromagnetic fields and by possible displacements in the magnetic field to be measured, are respectively opposed to each other and cancel each other; and A frequency meter also connected to the output of said amplifier.

Two embodiments of such a magnetometer are described in said prior patent application, wherein the two coils wound about the same sample and connected one to the input and the other to the output of the amplifier have their axes either perpendicular to each other (first embodiment) or parallel to each other (second embodiment).

The present invention relates to apparatus according to the second embodiment, wherein the two coils wound about one vessel have their axes parallel to each other, the coupling coefficients being opposed for the two samples. The two samples contain, on the one hand, a solvent with atomic nuclei the magnetic moment and angular momentum of which are both different from zero, whereby the gyromagnetic ratio is well determined, and, on the other hand, dissolved in this solvent, a paramagnetic substance, in particular a free ion or radical with an unpaired electron, having at least one electronic resonance line saturable by an electromagnetic field of a frequency different from zero even in a magnetic field tending toward zero. The whole of the two samples, whether substantially identical or different (but containing in this case the same atomic nuclei in the solvent), having two electronic resonance lines, either of different frequencies or of the same frequency, saturation of one of the lines causing an increase of the absorption of energy at the nuclear resonance frequency of said atomic nuclei, whereas saturation of the other line causes stimulated energy emission at said nuclear resonance frequency. Means are provided for producing in every sample an electromagnetic field at the frequency of an electronic resonance line in order to saturate for the whole of the two samples the two above mentioned electronic resonance lines.

For the sake of simplicity in the following description.

The term "sample" designates a mass of solvent (enclosed in a vessel) containing atomic nuclei the magnetic-momentum and the angular momentum of which are both different from zero (therefore having a well determined gyromagnetic ratio) and containing in solution a paramagnetic substance (such as a free ion or radical having one or more unpaired electrons) with at least one electronic resonance line staturable by an electromagnetic field at a given high frequency whatever be the low value magnetic field in which the sample is located; and The term "head" designates the whole of the coils and of the samples associated therewith.

The present invention is more especially, although not exclusively, concerned with a magnetometer of the spin coupling oscillator type intended accurately to measure low value magnetic fields, such as the earth field, the value of which is of the order of 0.5 oe., that is to say 50,000 gammas or to detect very small variations of amplitude of these fields, for instance of the order to one tenth of a gamma.

There are already several known magnetometers of the spin coupling oscillator type. Most of them include only a sample and two coils perpendicular to each other and involve various drawbacks, in particular the presence of two forbidden measurement axes (that is to say axes along which no measurement is possible), any measurement being impossible when the lines of force of the magnetic field are parallel to the axis of either of the two coils at right angle to each other. Furthermore, such apparatus are too sensitive to parasitic electromagnetic fields and to quick displacements of the measurement head.

This double excessive sensitiveness has already been practically eliminated in apparatus made according to the above mentioned prior patent application. Furthermore, when the two coils associated with each sample are parallel to each other, a magnetometer according to said prior patent application has the further advantage of limiting the number of forbidden axes to a single one.

In most cases, the existence of a single forbidden axis does not constitute a substantial drawback. However, in some cases, in particular on board of aircrafts and chiefly on board of rockets and satellites, it may happen that the meaturement head is located in such manner that its forbidden axis coincides with the direction of the lines of force.

The object of the present invention is to provide a magnetometer which is better adapted than those existing at the present time to meet the requirements of prac- ice, in particular in that it comprises no forbidden axis while preserving, or possibly improving, the results of the prior apparatus.

The improvement according to the present invention to a magnetometer according to the second embodiment of the above mentioned prior patent application consists in duplicating, on the one hand, each of the samples into two samples and, on the other hand, each of the coils into two coils connected in series, the first of which keeps the direction it had and the second of which is at right angles to the first one, whereby the magnetometer includes:

Disposed in two identical couples, along two axes at 90° to each other, four units each comprising one coil connected to the input of a linear amplifier and one coil connected to the output of said amplifier, the two coils of one unit being wound parallelly about a sample disposed along their common axis with opposed coupling coefficients for the two systems of each couple, the four input coils being disposed in series-opposition manner, and the four output coils being disposed in parallel for each series of two coils belonging to different couples, Means for producing an electromagnetic field at the electronic resonance frequency to saturate the units of each couple so that one line of one of the samples produces an increase of the energy absorption at the resonance frequency of the atomic nuclei and one line of the other sample produces an emission of energy at said resonance frequency, and Means for measuring the frequency in the loop including the coils and the amplifier.

In a preferred embodiment of the invention the four samples contain, in the same volume of the same solvent, two paramagnetic substances for which the same frequency of the electromagnetic field excites two opposed electronic lines, one in each of the different samples, that is to say, two lines, one of which produces an increase of the energy absorption and the other of which produces the stimulated emission of energy at the nuclear resonance frequency of the solvent.

In a second embodiment of the invention, the four samples are identical and the magnetometer comprises two very high frequency generators for the production of the electromagnetic field, the frequencies of these two generators being chosen to excite two opposed electronic lines of the same paramagnetic substance contained in the two samples of a couple.

Whatever be the embodiment that is chosen, it may be noted that the invention involves a supplementary advantage consisting in the reduction of the gyromagnetic effect. This term designates a measurement error due to the fact that the frequency of precession of the nuclear spins is measured with the axis of the coils taken as reference, and that, if this axis moves with a given angular velocity about the magnetic field, this velocity is either added to, or subtracted from, the velocity of precession. When making use of the arrangement according to the present invention and when the gyromagnetic effect is maximum for one of the couples of coils and zero for the other, the amplifier sets itself on a frequency which is substantially the mean between the two precession frequencies (detected by the coils not subjected to the gyromagnetic effect and the frequency detected by the other coils). It is thus possible practically to reduce the importance of the gyromagnetic effect by a ratio averaging 2.

Preferred embodiments of the present invention will be hereinafter described with reference to the appended drawings given merely by way of examples and in which:

FIG. 3 is a view similar to FIG. 1 relating to a second embodiment making use of four identical samples.

Figure 1:
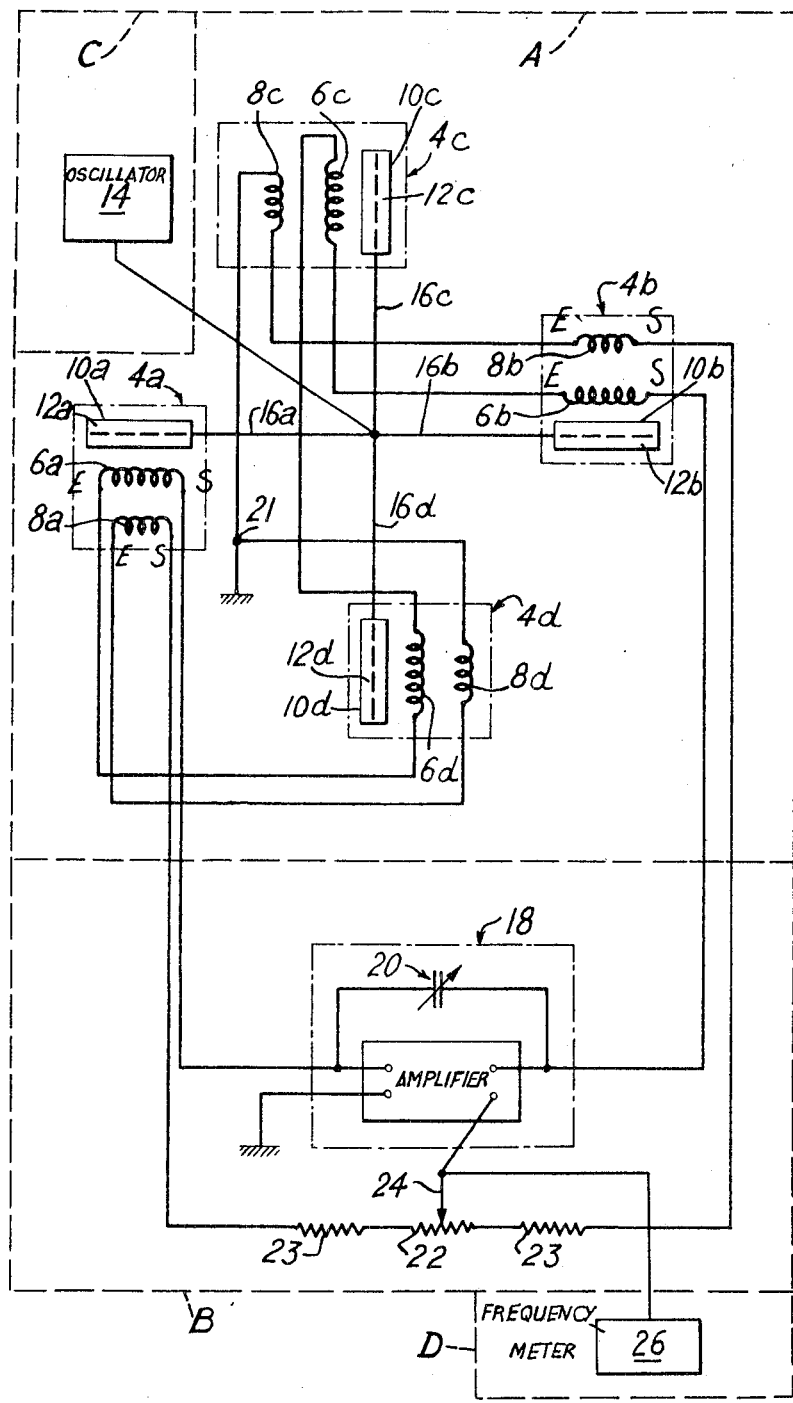
FIG. 1 is a block diagram of a magnetometer according to a first embodiment of the invention making use of two types of samples containing different paramagnetic substances, respectively.
Figure 2:
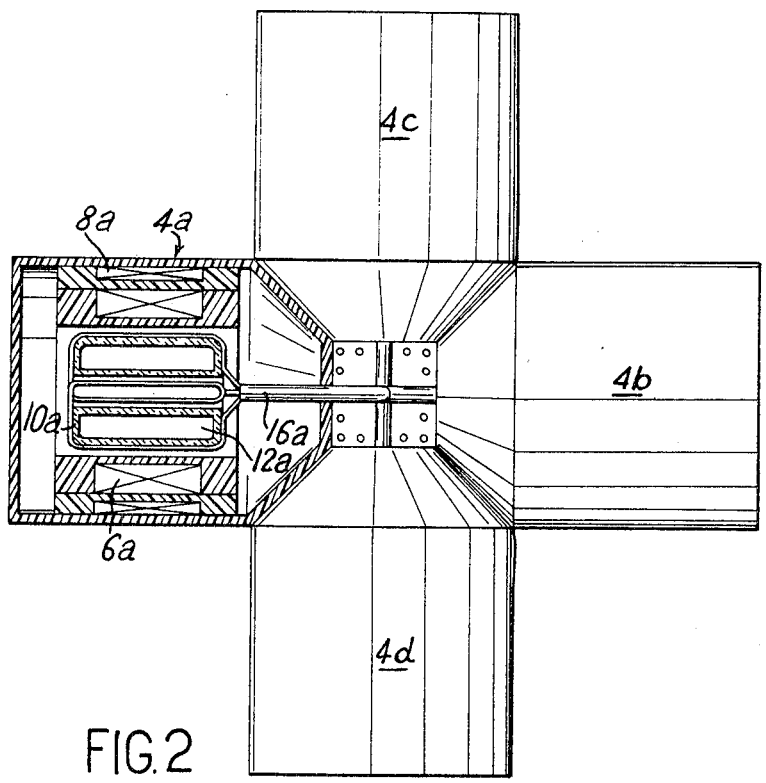
FIG. 2 shows the relative arrangement of the different components of the head of the magnetometer of FIG. 1.

The magnetometer of FIGS. 1 and 2 comprises a measurement head A located in the field to be measured, a loop amplifier B intended to cause a signal to appear at the nuclear resonance frequency F determined by the head, a generator C consisting of a very high frequency oscillator intended to excite the electronic resonance lines of the samples of the head and an apparatus D for measuring frequency F.

Measurement head A consists of four similar units $4a$, $4b$, $4c$, $4d$ forming two couples disposed at 90° and comprises two units in line with each other. Every unit $4a$, $4b$, $4c$, $4d$ comprises two coils $6a$, $6b$, $6c$ or $6d$ on the one hand, and $8a$, $8b$, $8c$ or $8d$ on the other hand, wound concentrically about a vessel $10a$, $10b$, $10c$ or $10d$ containing a sample $12a$, $12b$, $12c$ or $12d$, respectively. For the sake of clarity, the coils corresponding to each sample have been shown, in FIG. 1, as adjacent to each other and located on one side of this sample.

Input coils $6a$ and $6d$ are wound in the same direction, which direction is opposed to that of input coils $6b$ and $6c$, the corresponding coil of each couple. On the contrary, the two output coils belonging to each couple are wound in the same direction.

The input coils being coaxial with the corresponding output coils, they are not decoupled as a result of their directions. In order to eliminate the signals induced in the coils by parasitic causes (external electromagnetic fields, displacements of the magnetometer in the field to be measured, and so on), the coefficient of coupling by mutual induction between coils $6a$ and $8a$ (or $6d$ and $8d$) is given a value equal in magnitude and opposed in direction to that of coefficient of coupling between coils $6b$ and $8b$ (or $6c$ and $8c$) of the same couple. Equality between the coupling coefficients being opposed by adjustment and opposition being ensured owing to the arrangement mentioned in the preceding sentence, a suitable grouping of the coils, which will be described hereinafter permits of compensating for the action upon the amplifier of the electromotive forces induced by parasitic causes.

Every sample $12a$, $12b$, $12c$, $12d$ is constituted by: A solvent containing atomic nuclei having a magnetic moment and an angular momentum both different from zero, these values determining the gyromagnetic ratio $\gamma$ of the nuclei, and the resonance frequency F of these nuclei in a magnetic field of an intensity equal to H is given by the following formula:

$$F = \frac{\gamma}{2\pi} H \qquad (1)$$

the atomic nuclei being generally protons although use may also be made of other nuclei, in particular fluorine nuclei nuclei (in the first case, the solvent is generally constituted by a mixture of water and a hydrogenated liquid mixable with water and which solidifies only at low temperature); the solution also containing a paramagnetic substance in stable solution (free ion or radical including an unpaired electron in interaction with an atomic nucleus of the substance).

In the embodiment illustrated by FIG. 1, the two units in line with each other (for instance $4a$ and $4b$) which constitute a couple contain two samples $12a$ and $12b$ different from each other and preferably of the same volume. The two paramagnetic substances of these two samples are chosen so as to have, substantially at the same excitation frequency, two electronic resonance lines opposed with respect to each other.

For one of the samples (for instance $12a$), the paramagnetic substance is chosen such that saturation, by the electromagnetic field at frequency $f$, of an electronic resonance line at a frequency close to $f$ produces an increase of the energy of absorption intensity at the (nuclear)

resonance frequency of the nuclei, given by the above Formula 1. For the other sample, the substance is chosen so that the same frequency *f* excites an electronic resonance line the saturation of which produces a stimulated emission of energy at the (nuclear) resonance frequency of the nuclei, given by Formula 1.

It is possible for instance to use as the first sample a M/800 concentration solution of DTBN (Ditertio-butyl-nitroxide) ion a mixture containing 50% by volume of water and 50% of acetone and a second sample, a M/1600 concentration solution of TANO (tri-acetonamine-nitroxide) in a mixture consisting of 70% by volume of water and 30% of ethylene-glycol. Application of an electromagnetic field of a frequency averaging 68.5 mHz. saturates the lower electronic resonance line of TANO, which involves an increase of the energy absorption by said TANO at the nuclear resonance frequency (ranging from 2000 to 2100 Hz. for protons in the earth magnetic field), and the upper electronic resonance line at 69.4 mHz. of DTBN, which causes a stimulated emission of energy by the latter at the nuclear frequency of 2000–2100 Hz. for protons in the earth magnetic field.

Other couples of samples may of course be used. For instance we may use, on the one hand, the above mentioned TANO solution and, on the other hand, a milli-normal solution of "tanoxine six."

$$NO[C(CH_3)_2CH_2]_2C=NOH$$

in water mixed with one third of glycol (resonance frequency 69 mHz.).

Excitation of the electronic resonance lines of the samples is performed by means of a single very high frequency oscillator 14 (which constitutes unit C) through coaxial cables 16a, 16b, 16c and 16d, feeding resonating cavities (not shown in FIG. 1) occupied by samples 12a, 12b, 12c and 12d disposed in vessels 10a, 10b, 10c and 10d of annular shape. The relative arrangement of every coaxial cable and of the corresponding sample may be similar to that shown by FIGS. 4 and 5 of the above mentioned prior patent application.

The input coils 6a, 6b, 6c, 6d are connected in series with the input of a linear amplifier 18 of low frequency (from 2000 to 2100 Hz. when H is equal to 0.5 oersted and the nuclei are protons). A tuning adjustable capacitor 20 of some thousands of pf. mounted in shunt across the input constitutes, together with the arrangement in series at the four coils 6a, 6b, 6c, 6d, a resonating circuit of low Q factor to avoid pulling.

The four output coils 8a, 8b, 8c, 8d are connected to the output of amplifier 18 and arranged in such manner that the useful signals of all the units are added to one another and that the parasitic signals are eliminated due to the opposition between the parasitic signals which appear in two coils belonging to the same couple. (In FIG. 1, E and S designate respectively the input and output of some coils.)

For this purpose, the two coils 8a and 8d are mounted in series and are both associated with a first type of sample and have, with respect to coils 6a and 6b, coupling coefficients which are equal and of the same direction. The two coils 8b and 8c are likewise mounted in series. The two branches thus constituted, are connected, on the one hand, with the ground at 21, and, on the other hand, with the ends of an adjustable potentiometer 22–23 the wiper point 24 of which is connected with the output of amplifier 18. Potentiometer 22–23 permits of improving the balancing of the circuit in case of small differences in the induction coefficients.

Frequency meter 26 permits of measuring the nuclear resonance frequency F in the loop of the amplifier, which frequency is exactly proportional to the intensity of the magnetic field in the absence of pulling, this last mentioned phenomenon being practically eliminated as a result of the small Q factor of the input circuit.

The operation of the magnetometer results clearly from the preceding discussion and from the teachings of the above mentioned prior patent. Therefore, it will be only briefly described. The electronic resonance lines excited in the four samples cause (in the presence of a magnetic field) the appearance of a macroscopic component having a given direction in samples 12a and 12d and an opposed direction in samples 12b and 12c. It follows that the macroscopic resultants of the magnetic moments of the whole of the atomic nuclei of samples 12a and 12b on the one hand, 12c and 12d on the other hand, are in phase opposition because the direction of winding of coils 6a and 6d is opposed to that of coils 6b and 6c and the couplings between the coils of the units are fixed. Therefore, the electromotive forces due to nuclear resonance that are induced in coils 6a, 6b, 6c and 6d are added to one another.

The measurement head diagrammatically illustrated by FIG. 2, disposed in a supporting casing (not shown) made of a non-magnetic material, is made of four units connected to conductors extending between the terminals of the coils indicated by points. Units 4a and 4d comprise an annular vessel containing some cubic centimeters of a solution of DTBN of a concentration equal to M/800 in 50% by volume of water and 50% by volume of acetone. Units 4b and 4c an equal volume of a M/1600 solution of TANO in a mixture of water and ethylene-glycol.

Saturation of the electronic resonance lines of the four samples is effected through four shunt extensions 16a, 16b, 16c and 16d of a single coaxial cable fed from a 68.5 mHz. oscillator (not shown). Every shunt extension 16a, 16b, 16c or 16d feeds a resonating cavity limited by silver foils disposed side by side on the external wall of the vessel so as to constitute a screen opaque to the 68.5 mHz. electromagnetic field but transparent to the nuclear resonance frequency (which averages 2000–2100 Hz. in the earth magnetic field).

For instance, about vessel 10a are concentrically disposed an input coil 6a and an output coil 8a. Coil 6a, connected in series with coils 6b, 6c and 6d picks up a voltage at the nuclear resonance frequency. The coils such as 8a, for reinsertion of the signal, are connected two by two, in shunt arrangement, between the ground and the output of amplifier 18.

By way of example, every input coil may include 2128 turns of enameled wire (of a diameter of 30/100 of a mm.) and every output coil may include 114 turns of enameled wire (of the same diameter). Resistors 23 (FIG. 1) may be each of 4700 ohms and potentiometer 22 may have a total value of 100 ohms.

Attention is called to the constructional symmetry of this head which has many advantages:

A first balancing may be performed by merely modifying the mechanical arrangement of the four units with respect to the center of the head; excitation of the four samples through coaxial cables is identical for all the samples. This last feature constitutes an advantage with respect to the arrangements disclosed in FIGS. 4 and 5 of the above mentioned prior patent application, wherein the input of the coaxial cable, for one of the samples, must be eventually compensated for.

On the other hand, the central space between the four units supplies a protected volume wherein may be placed the connections between the coils of the units.

FIG. 3 diagrammatically shows the head and the high frequency oscillators of a magnetometer made according to another embodiment of the invention, wherein the four samples are identical. In this FIG. 3, the elements corresponding to those of FIG. 1 are designated by the same reference numerals. The four samples consists for instance of a solution of DTBN in a solvent consisting of a mixture of 50% by volume of water and 50% by volume of acetone.

DTBN has two opposed electronic resonance lines at 69.4 and 72 mHz. in a magnetic field of the order of 50,000 gammas (corresponding to the mean value of the earth field). Oscillator 30 which excites the samples of unit 4a and 4d is quartz piloted and set to a frequency of 69.4 mHz., whereas oscillator 32 which excites the samples of unit 4b and 4c, is quartz piloted and set to a frequency at 72 mHz. The operation is then the same as that of the preceding embodiment.

Although this construction is possible, its operation involves some difficulties. As a matter of fact, as the samples are very close to one another, it is difficult to avoid interferences of effect between the two oscillators. The tuning of the resonating cavities is much more complicated than in the preceding case where it is facilitated by the symmetry of mounting. The presence of two oscillators instead of a single one involves an increased consumption of energy.

In a general manner, while the above description discloses preferred embodiments of the invention, it should be well understood that said invention is not limited thereto as there might be changes made in the arrangement, disposition and form of the parts without departing from the present invention.

What is claimed is:

1. A device for measuring the intensity of a weak magnetic field, such as the magnetic field of the earth, comprising in combination; a first and a second pair of magnetometer heads, each of the four heads comprising:

a vessel containing a first and a second type of particles having gyromagnetic properties;

said first type of particles being essentially the same for all four heads and having a nuclear resonance frequency in the magnetic field to be measured;

said second type of particles being essentially the same at least in both heads of a same pair and having in said magnetic field an electronic resonance line saturable by an electromagnetic field at the frequency of said resonance line, said second type of particles having a resonance line in one of said pair of heads different from the resonance line of the other of said pair of heads, saturation of one of said resonance lines resulting in an increase of energy absorption at the nuclear resonance frequency by the first type of particles which are contained in the same vessel with the second type of particles which are saturated at said one resonance line, saturation of the other of said resonance lines resulting in a stimulated emission of energy at said nuclear resonance frequency by the first type of particles which are contained in the same vessel with the second type of particles which are saturated at said other resonance line; and a first coil surrounding said vessel and a second coil, coaxial with said first coil and also surrounding said vessel, said coils being coupled together through said first type of particles;

said four heads being disposed with their respective coil axes generally coplanar, the coils of one head in each pair being disposed with axes generally in one direction and the coils of the other head in each pair being disposed with axes generally perpendicular to said one direction;

a substantially linear amplifier having input terminals and output terminals, the four said first coils of said four heads being connected together in series between the input terminals of said amplifier, those of said four first coils which have their axes directed along a same direction being wound in opposite directions, each of the two of said second coils which have their axes directed generally perpendicular being connected in series and both of said series connections of perpendicular coils being connected across the output terminals of said amplifier, the coefficient of coupling between the first and the second coil of each head being of opposite algebraic sign for the two heads having coils with axes disposed in the same direction;

a frequency meter connected across the output terminals of said amplifier, the frequency measured by said frequency meter being proportional to said magnetic field intensity; and means for producing inside each of said four vessels an electromagnetic field at the electronic resonance frequency of the respective particles of said second type in each respective vessel, in order to saturate the corresponding electronic resonance line to produce an increase of the energy absorption at the nuclear resonance frequency in both heads of said first pair and an emission of energy at the nuclear resonance frequency in both heads of said second pair.

2. A device according to claim 1, wherein both vessels of one of said pair of heads contain, in a solvent including said particles of said first type, a first paramagnetic substance including a first kind of said particles of said second type, and wherein both vessels of the other of said pair of heads contain, in substantially the same volume of the same solvent as both vessels of said one pair, a second paramagnetic substance including a second kind of said particles of said second type, the two kinds of particles of the second type having the said electronic resonance lines at a same common frequency so that an electromagnetic field at said common frequency produces in said first pair of heads an increase of energy absorption at the nuclear resonance frequency and in said second pair of heads a stimulated emission of energy at the nuclear resonance frequency, the device including, as means for producing inside each of the four vessels an electromagnetic field, a single high frequency generator for generating at said common frequency and four excitation coils fed by said generator, each excitation coil being associated to a different head and located to generate an electromagnetic field at said common frequency inside said vessel.

3. A device according to claim 2, further comprising a non-magnetic casing enclosing said four heads, each with the associated excitation coil, four coaxial cables, each feeding a different one of said four excitation coils, and a common coaxial cable disposed at the center of symmetry of the four heads for feeding said first mentioned four coaxial cables, said common coaxial cable being fed by said generator.

4. A device according to claim 1, wherein both vessels of one of said pair of heads contain, in a solvent including said particles of said first type, a paramagnetic substance including said particles of said second type, and wherein both vessels of the other of said pair of heads contain, in substantially the same volume of the same solvent as the vessels of said one pair, the same paramagnetic substance including said particles of said second type, said common paramagnetic substance having two separate electronic resonance lines at two different frequencies so that an electromagnetic field at a first of said two different frequencies produces an increase of energy absorption at the nuclear resonance frequency, whereas an electromagnetic field at a second of said two different frequencies produces a stimulated emission of energy at the nuclear resonance frequency, the device including, as means for producing inside each of the four vessels an electromagnetic field, a first and a second high frequency generator for generating, respectively at said first and said second different frequencies, and two pairs of excitation coils, the excitation coils in said first pair being fed by said first generator and being located for generating an electromagnetic field at said first of the two different frequencies inside both vessels of said first pair of heads, whereas the excitation coils in said second pair are fed by said second generator and are located for generating an electromagnetic field at said second of the two different frequencies inside both vessels of said second pair of heads.

5. A device according to claim 1, comprising a non-magnetic casing and means for adjustably mounting each of said four heads in said casing so that the position of each head can be slightly modified with respect to the positions of the others heads.

References Cited

UNITED STATES PATENTS 3,396,329  8/1968  Salvi _____ 324—0.5
3,403,326  9/1968  Salvi _____ 324—0.5
3,404,332  10/1968 Abragam _____ 324—0.5

RUDOLPH V. ROLINEC, Primary Examiner

MICHAEL J. LYNCH, Assistant Examiner